US010323573B2

(12) United States Patent
Lutjen et al.

(10) Patent No.: US 10,323,573 B2
(45) Date of Patent: Jun. 18, 2019

(54) AIR-DRIVEN PARTICLE PULVERIZER FOR GAS TURBINE ENGINE COOLING FLUID SYSTEM

(71) Applicant: United Technologies Corporation, Hartford, CT (US)

(72) Inventors: Paul M. Lutjen, Kennebunkport, ME (US); Anthony B. Swift, North Waterboro, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 518 days.

(21) Appl. No.: 14/804,926

(22) Filed: Jul. 21, 2015

(65) Prior Publication Data

US 2016/0032835 A1 Feb. 4, 2016

Related U.S. Application Data

(60) Provisional application No. 62/031,303, filed on Jul. 31, 2014.

(51) Int. Cl.
*F02C 7/05* (2006.01)
*F02C 7/18* (2006.01)
(Continued)

(52) U.S. Cl.
CPC ................ *F02C 7/18* (2013.01); *F01D 11/12* (2013.01); *F01D 25/12* (2013.01); *F02C 7/05* (2013.01); *F05D 2240/11* (2013.01); *F05D 2260/607* (2013.01); *Y02T 50/671* (2013.01); *Y02T 50/675* (2013.01)

(58) Field of Classification Search
CPC ... F01D 9/00; F01D 9/02; F01D 9/023; F01D 9/04; F01D 9/041; F01D 9/047; F01D 11/005; F01D 11/02; F01D 11/12; F01D 11/122; F01D 11/125; F01D 25/12; F01D 25/125; F02C 7/05; F02C 7/052; F02C 7/18; F02C 7/28; F05D 2240/11; F05D 2260/20; F05D 2260/607
See application file for complete search history.

(56) References Cited

U.S. PATENT DOCUMENTS 3,338,049 A 4/1967 Fernberger
4,304,094 A 12/1981 Amelio
(Continued)

OTHER PUBLICATIONS

MatWeb printout of material properties of titanium, http://www.matweb.com/search/DataSheet.aspx?MatGUID=66a15d609a3f4c829cb6ad08f0dafc01, accessed Nov. 13, 2017.*
(Continued)

*Primary Examiner* — Scott J Walthour
(74) *Attorney, Agent, or Firm* — Carlson, Gaskey & Olds, P.C.

(57) ABSTRACT

A cooling fluid system for a gas turbine engine includes a structure that provides a fluid passageway. The structure has a wall with an aperture that is in fluid communication with the fluid passageway. The aperture is configured to provide a fluid in a flow direction. Fingers are arranged in the fluid passageway facing into flow direction. The fluid passageway includes a cooling cavity immediately downstream from the fingers and it is configured to receive fluid having passed over or through the fingers.

13 Claims, 3 Drawing Sheets

(51) Int. Cl.
*F01D 11/12* (2006.01)
*F01D 25/12* (2006.01)

(56) References Cited

U.S. PATENT DOCUMENTS

| | | | | |
|---|---|---|---|---|
| 4,386,780 | A * | 6/1983 | Dernedde | B04B 1/04 277/429 |
| 4,808,073 | A * | 2/1989 | Zaehring | F01D 5/081 415/175 |
| 5,222,693 | A | 6/1993 | Slutzkin et al. | |
| 6,134,874 | A | 10/2000 | Stoten | |
| 6,471,216 | B1 * | 10/2002 | Brainch | F01D 11/02 277/418 |
| 7,770,375 | B2 | 8/2010 | Alvanos et al. | |
| 8,240,121 | B2 | 8/2012 | Hazzard et al. | |
| 8,539,748 | B2 | 9/2013 | Petrowicz et al. | |
| 2003/0035722 | A1 * | 2/2003 | Barrett | F01D 9/04 415/200 |
| 2003/0062256 | A1 * | 4/2003 | Gueldry | F01D 11/001 204/192.12 |
| 2004/0090013 | A1 * | 5/2004 | Lawer | F01D 11/08 277/412 |
| 2008/0310951 | A1 * | 12/2008 | Bremer | F01D 5/081 415/121.2 |
| 2011/0067378 | A1 | 3/2011 | Tibbott et al. | |
| 2014/0017072 | A1 * | 1/2014 | McCaffrey | F01D 11/127 415/173.1 |

OTHER PUBLICATIONS

MatWeb printout of material properties of alumina, http://www.matweb.com/search/datasheet.aspx?matguid=c8c56ad547ae4cfabad15977bfb537f1, accessed Nov. 13, 2017.*

Investigation of Sand Blocking Within Impingement and Film-Cooling Holes. N.D. Cardwell, Journal of Turbomachinery, Apr. 2010, vol. 132/021020-1.

* cited by examiner

AIR-DRIVEN PARTICLE PULVERIZER FOR GAS TURBINE ENGINE COOLING FLUID SYSTEM

CROSS-REFERENCE TO RELATED APPLICATIONS

This application claims priority to U.S. Provisional Application No. 62/031,303, which was filed on Jul. 31, 2014 and is incorporated herein by reference.

STATEMENT REGARDING FEDERALLY SPONSORED RESEARCH OR DEVELOPMENT

This invention was made with government support under Contract No. FA8650-09-D-2923-0021, awarded by the U.S. Air Force. The Government has certain rights in this invention.

BACKGROUND

This disclosure relates to an air-driven particle pulverizer for a gas turbine engine cooling fluid system.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

In a typical gas turbine engine, cooling fluid is provided from the compressor section to other regions of the engine. Typically, dirt particles are driven toward the outer diameter of the core flow path in the compressor section. These dirt particles may undesirably be provided to engine components, such as a high pressure turbine blade outer air seals. Cooling holes within the blade outer air seal may become plugged with dirt particles. To prevent plugging of the cooling holes, the holes may be enlarged from their desired design hole size. As a result, the holes may be larger than desired for cooling.

Honeycomb structures have been used to collect dirt in a fluid passageway, but these structures are not designed to break the dirt particles. Moreover, these structures have obstructed cooling flow.

SUMMARY

In one exemplary embodiment, a cooling fluid system for a gas turbine engine includes a structure that provides a fluid passageway. The structure has a wall with an aperture that is in fluid communication with the fluid passageway. The aperture is configured to provide a fluid in a flow direction. Fingers are arranged in the fluid passageway facing into flow direction. The fluid passageway includes a cooling cavity immediately downstream from the fingers and it is configured to receive fluid having passed over or through the fingers.

In a further embodiment of the above, a cooling fluid source is in fluid communication with the structure upstream from the aperture.

In a further embodiment of any of the above, the cooling fluid source is a compressor section. The structure is an engine static structure that is arranged in a turbine section.

In a further embodiment of any of the above, the structure is a vane support.

In a further embodiment of any of the above, the engine static structure includes a blade outer air seal that is arranged in the cooling cavity and is downstream from the fingers.

In a further embodiment of any of the above, the fingers are canted toward the aperture.

In a further embodiment of any of the above, the aperture is directed at the fingers.

In a further embodiment of any of the above, the gas turbine engine includes an engine axis, and a radial direction normal to the engine axis. The fingers are arranged at a non-normal angle relative to the engine axis and the radial direction.

In a further embodiment of any of the above, the fingers are spaced axially relative to one another at an acute angle.

In a further embodiment of any of the above, the fingers are tapered to an apex.

In a further embodiment of any of the above, the fingers include a coating that provides a hardness greater than a finger substrate.

In a further embodiment of any of the above, an enlarged recess is provided between the fingers.

In a further embodiment of any of the above, the fingers increase in length as a distance from the aperture increases.

In another exemplary embodiment, an air-driven particle pulverizer for a gas turbine engine includes an array of fingers that are arranged about an axis and canted toward one side.

In a further embodiment of any of the above, a radial direction is normal to the axis. The fingers are arranged at a non-normal angle relative to the axis and the radial direction.

In a further embodiment of any of the above, the fingers are spaced axially relative to one another at an acute angle.

In a further embodiment of any of the above, the fingers are tapered to an apex.

In a further embodiment of any of the above, the fingers include a coating that provides a hardness greater than a finger substrate.

In a further embodiment of any of the above, an enlarged recess is provided between the fingers.

In a further embodiment of any of the above, the fingers increase in length as a distance from the side increases.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
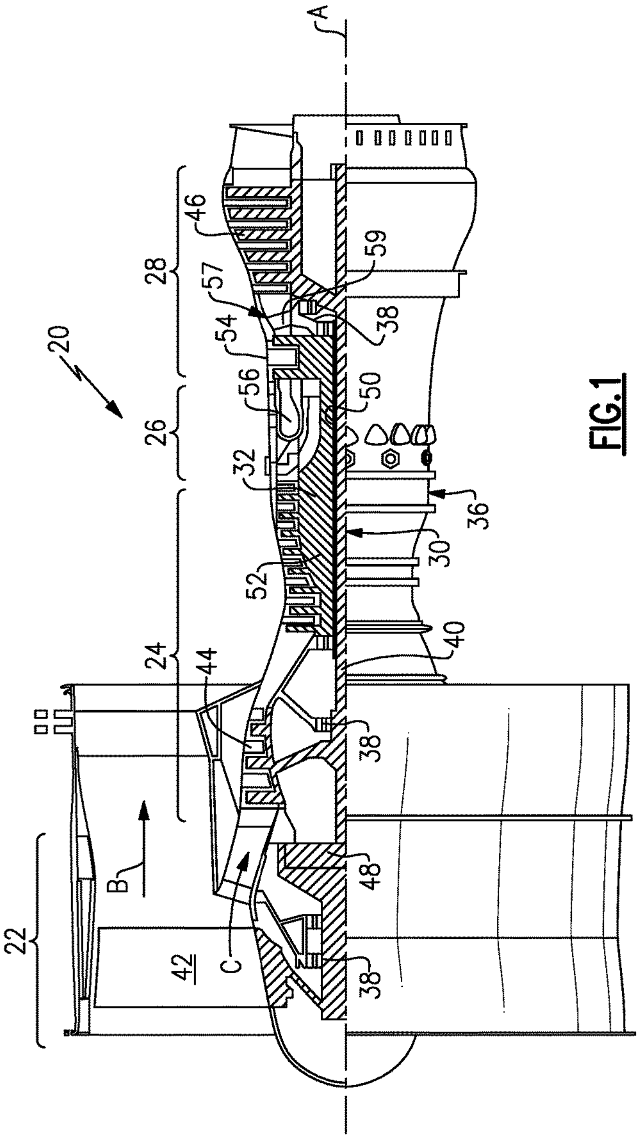
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}\ ^\circ \text{R})/(518.7^\circ\ \text{R})]^{0.5}$. The "Low corrected fan tip speed" as disclosed herein according to one non-limiting embodiment is less than about 1150 ft/second (350.5 meters/second).

Figure 2:
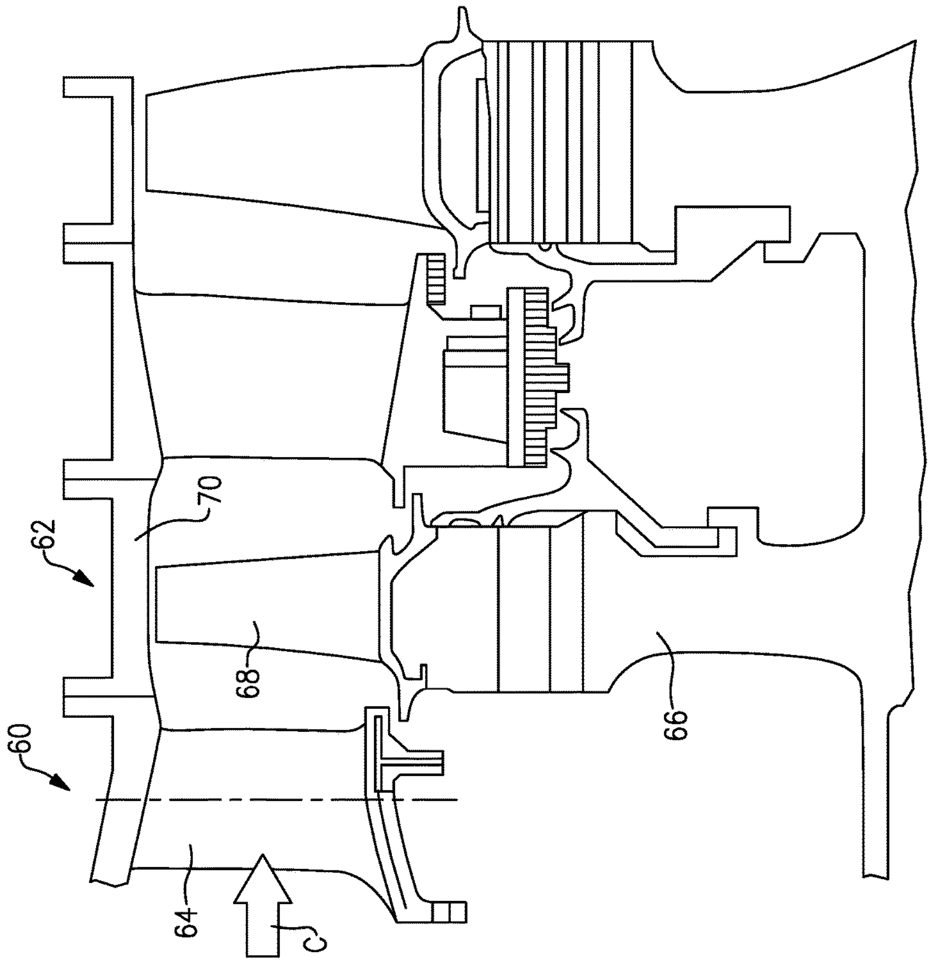
FIG. 2 is a schematic view of a section of the gas turbine engine.

An example section of the engine 20 is show in FIG. 2. The illustrated section includes a fixed stage 60 upstream from a rotating stage 62. The fixed stage 60 includes a circumferential array of vanes 64. The rotating stage 62 includes a circumferential array of blades 68 mounted to a rotor 66 that is arranged downstream from the vane 64. A blade outer air seal 70 is provided at an outer diameter of the blades 68 to provide a seal relative to a tip 72 of the blades 68.

Figure 3:
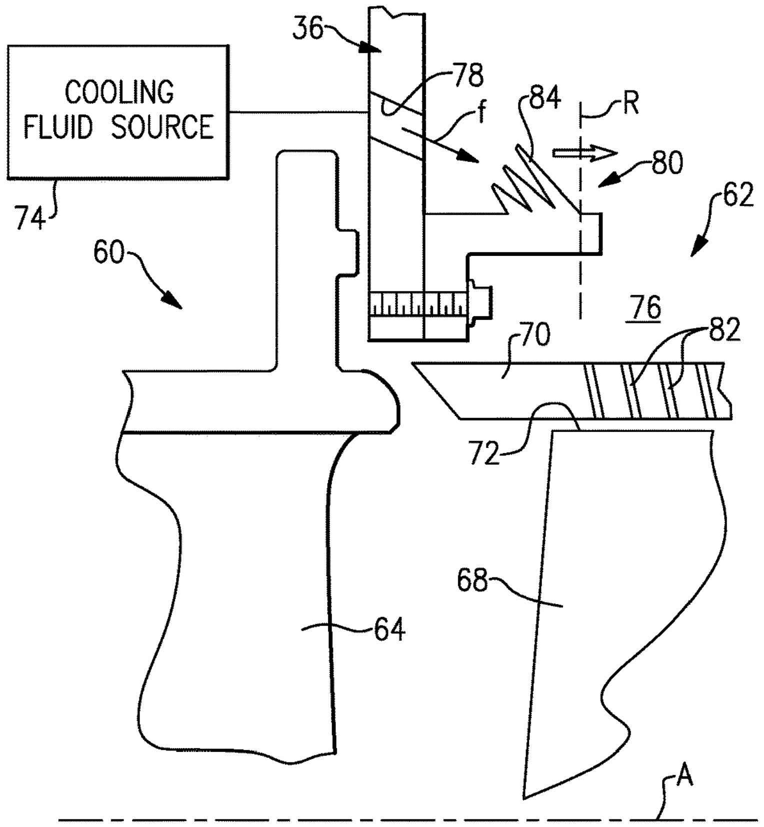
FIG. 3 is an enlarged cross-sectional view of an example air-driven particle pulverizer in the section shown in FIG. 2.

Referring to FIG. 3, a cooling fluid source 74, such as a compressor section, provides cooling fluid to the blade outer air seal 70. In one example, the engine static structure 36 includes a wall that supports the vanes 64. The wall has an aperture 78 in fluid communication with a fluid passageway provided in the engine static structure 36. The aperture is configured to provide a fluid f in a flow direction.

An air-driven particle pulverizer 80 is supported by the engine static structure 36, integrally or separately, and is arranged in the fluid passageway. The air-driven particle pulverizer includes fingers 84 facing into the flow F. The fluid passageway includes a cooling cavity 76 immediately downstream from the fingers 84 and which is configured to receive unobstructed fluid from the fingers 84. That is, in the example, the cooling cavity 76 is not in a discrete, separate cavity from the air-driven particle pulverizer 80.

The blade outer air seal 70 is in fluid communication with the cooling cavity 76 downstream from the fingers 84. The blade outer air seal 70 includes cooling holes 82 that provide a fluid to an area adjacent to the tip 72.

Figure 4:
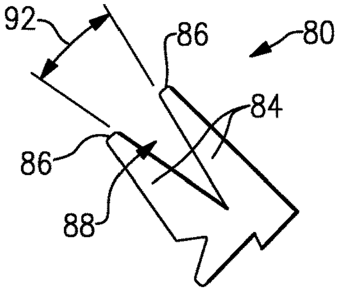
FIG. 4 is an enlarged cross-sectional view of the air-driven particle pulverizer.

As shown in FIGS. 3 and 4, the fingers 84 are canted toward the aperture 78. The fingers 84 spaced axially relative to one another at an acute angle 92, shown in FIG. 4. In one example, the aperture 78 directs the fluid F onto the fingers 84 to better encourage the particles, (such as, for example, dirt, sand, CMAS or airborne contaminants) to collide with the fingers, breaking the larger dirt particles entrained in the fluid into smaller particles.

A radial direction R is arranged normal to the engine axis A. The fingers 84 are arranged at a non-normal angle relative to the engine axis and the radial direction R. Axially spaced apart arrays of annular fingers 84 may be provided. The fingers 84 may instead be arranged only near the apertures 78 to reduce the weight of the air-driven particle pulverizer. In the example, the fingers 84 increase in length as the distance from the aperture 78 increases.

In this manner, the dirt particles will more directly collide into terminal ends 86 of the fingers 84. In the example shown, the fingers 84 are tapered to an apex, which provides the terminal ends 86. The fingers 84 may be coated with a suitable material (such as, for example, a chromium-carbide-based material like plasma sprayed chromium carbide-nickel chromium) to provide hardness that is greater than a finger substrate, which may be nickel alloy.

Figure 5:
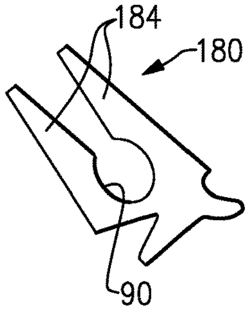
FIG. 5 is an enlarged cross-sectional view of another example air-driven particle pulverizer.

A tapered recess 88 between the fingers 84 captures large particles that may be wedged into the recess by their momentum. Referring to FIG. 5, an enlarged recess 90 may be arranged between adjacent fingers 184 to collect dirt particles, if desired, which prolongs the interval at which the air-driven particle pulverizer 180 should be cleaned.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A cooling fluid system for a gas turbine engine comprising:

a structure providing a fluid passageway, the structure having a wall with an aperture in fluid communication with the fluid passageway, the aperture being configured to provide a fluid in a flow direction; and fingers arranged in the fluid passageway facing into the flow direction wherein each of the fingers comprises a base and a terminal end, each finger extending from the base toward the aperture to the terminal end, each terminal end exposed to fluid flowing from the aperture, the aperture configured to impinge the fluid substantially directly onto each terminal end for pulverizing particles in the fluid, the fluid passageway including a cooling cavity immediately downstream from the fingers and configured to receive fluid having passed over or through the fingers, wherein the fingers are spaced along the flow direction relative to one another, and wherein an acute angle is formed between adjacent fingers.

2. The cooling fluid system according to claim 1, comprising a cooling fluid source in fluid communication with the structure upstream from the aperture.

3. The cooling fluid system according to claim 2, wherein the cooling fluid source is a compressor section, and the structure is an engine static structure arranged in a turbine section.

4. The cooling fluid system according to claim 3, wherein the engine static structure is a vane support.

5. The cooling fluid system according to claim 1, wherein the fingers are canted toward the aperture.

6. The cooling fluid system according to claim 5, wherein the aperture is oriented toward the fingers.

7. The cooling fluid system according to claim 1, wherein the fingers are each tapered to an apex.

8. The cooling fluid system according to claim 1, wherein the fingers include a coating providing a hardness greater than a finger substrate.

9. The cooling fluid system according to claim 1, wherein a recess is provided between adjacent fingers.

10. The cooling fluid system according to claim 1, wherein the fingers increase in length as a distance from the aperture increases.

11. The cooling fluid system according to claim 1, wherein a blade outer air seal is arranged in the cooling cavity.

12. The cooling fluid system according to claim 1, wherein the fingers are formed from a nickel alloy.

13. A cooling fluid system for a gas turbine engine comprising:

a structure providing a fluid passageway, the structure having a wall with an aperture in fluid communication with the fluid passageway, the aperture being configured to provide a fluid in a flow direction;

a cooling fluid source in fluid communication with the structure upstream from the aperture, wherein the cooling fluid source is a compressor section, and the structure is a vane support of an engine static structure arranged in a turbine section; and fingers arranged in the fluid passageway facing into the flow direction wherein each of the fingers comprises a base and a terminal end, each finger extending from the base toward the aperture to the terminal end, each terminal end being directed at the aperture, the fluid passageway including a cooling cavity downstream from the fingers and configured to receive unobstructed fluid from the fingers, wherein the engine static structure includes a blade outer air seal arranged in the cooling cavity and downstream from the fingers.

* * * * *